Figure 1:
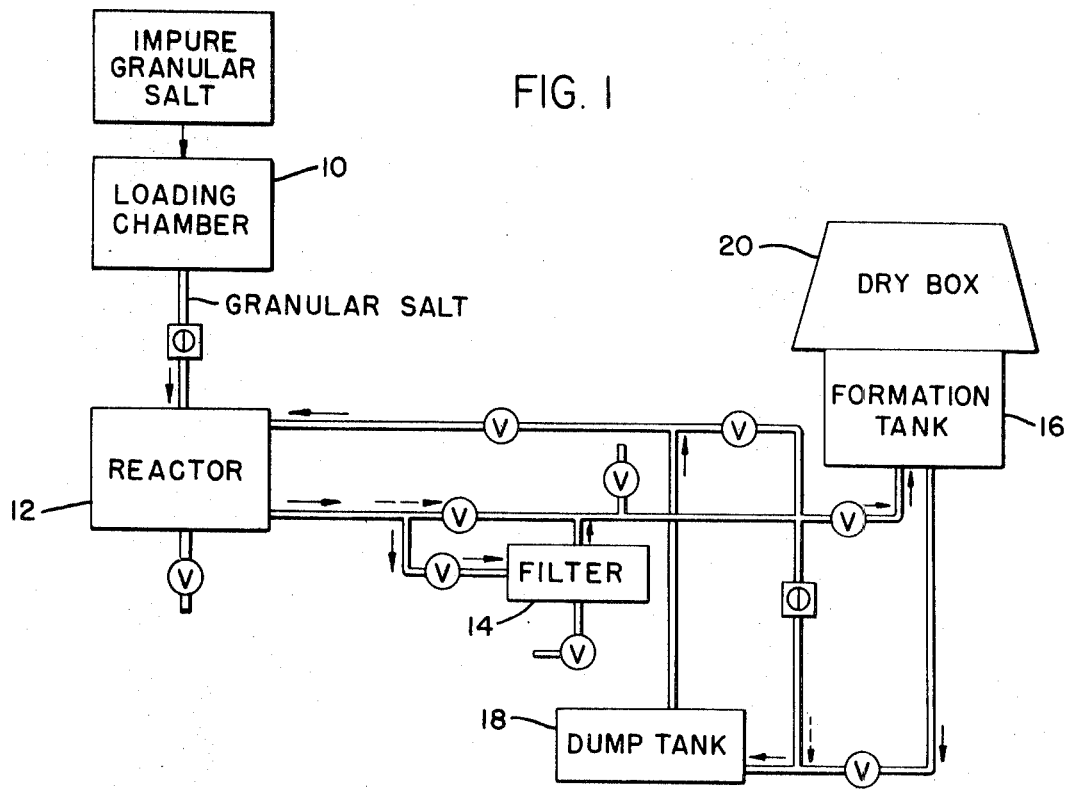

United States Patent

[11] 3,607,407

[72] Inventor Harry A. Adams
 Bedford Heights, Ohio
[21] Appl. No. 848,219
[22] Filed Aug. 7, 1969
[45] Patented Sept. 21, 1971
[73] Assignee The Standard Oil Company
 Cleveland, Ohio

[54] A METHOD OF PURIFYING THE ELECTROLYTE SALT EMPLOYED IN AN ELECTROCHEMICAL CELL
 5 Claims, 2 Drawing Figs.
[52] U.S. Cl. .................................................. 136/153,
 136/155
[51] Int. Cl. ...................................................... H01m11/00
[50] Field of Search .............................................. 136/153,
 154, 155, 156, 161, 100; 204/130, 186

[56] References Cited
UNITED STATES PATENTS

| | | | |
|---|---|---|---|
| 2,782,156 | 2/1957 | Raynes ........................ | 204/130 X |
| 3,238,437 | 3/1966 | Foster et al. .................. | 136/153 X |
| 3,355,328 | 11/1967 | Meyers et al. ................ | 136/93 |
| 3,428,493 | 2/1969 | Adams ......................... | 136/100 |
| 3,481,853 | 12/1969 | Clark............................ | 204/186 |

Primary Examiner—Winston A. Douglas
Assistant Examiner—A. Skapars
Attorneys—John F. Jones and Sherman J. Kemmer ABSTRACT: A process is described for increasing the energy storage capacity and cell like of an electrical energy storage device comprising a porous carbon cathode, a lithium alloy anode and a fused salt electrolyte composed of an alkali metal halide or an alkaline earth metal halide or mixtures thereof, wherein the electrolyte salt is purified electrochemically before use and is subsequently circulated to the electrochemical cell.

INVENTOR.
HARRY A. ADAMS
BY
*John F. Jones*
ATTORNEY

A METHOD OF PURIFYING THE ELECTROLYTE SALT EMPLOYED IN AN ELECTROCHEMICAL CELL

SALT PURIFICATION AND CIRCULATION SYSTEM

This invention relates to a method for increasing the energy storage capacity and the cell life of an electrical energy storage device. More particularly, this invention relates to a method for increasing the energy storage capacity and the cell life of an electrical energy storage cell comprising a porous carbon cathode, a lithium alloy anode, and said electrodes being immersed in or in contact with a fused salt electrolyte composed of an alkali metal halide or an alkaline earth metal halide, or mixtures thereof.

Essentially, this invention comprises a method of treating the electrolyte salt employed in an electrochemical cell to remove impurities therefrom, and a means for continuously circulating the treated molten salt to the electrochemical cell. A further aspect of this invention comprises the use of the treated salt as an electrolyte in the electrochemical "preconditioning" of the carbon electrode to improve its electrical energy storage capacity.

Heretofore, commercially available salts have been virtually unacceptable for use as electrolytes in fused salt energy storage devices because of the presence of varying amounts of impurities. The exact nature of these impurities is not known, however, small amounts of moisture, adsorbed gases and trace to small amounts of various other metals and metal oxides are known to be present. These impurities have an adverse effect on cell life and efficiency of the electrochemical cell, by causing increased leakage current and corrosion of the cell, and a lowering of the decomposition potential of the electrolyte. These adverse effects can minimized by the utilization as an electrolyte a slat that has been treated in a manner as described herein.

"Preconditioning" of the electrodes as referred to in this invention constitutes the removal of easily degradable components in the structure of the electrode and the permeation of the electrode with electrolyte by alternately charging in a positive direction and then discharging in a negative direction while in contact with the electrolyte. These steps amount to electrochemical oxidation and reduction reactions and result in changing the carbon structure by removing substantially all of the oxygen and hydrogen and most of the ash from the electrode.

In accordance with the process of this invention, the harmful impurities normally present in commercial grades of salts such as alkali metal halides and alkaline earth metal halides are removed by electrochemical treatment of the fused salt. Briefly, in this particular embodiment, the impure, granular salt is placed in a loading chamber where excess moisture is removed by heating the salt to a temperature below its melting point under an inert atmosphere and reduced pressure. After drying to a constant low level moisture content, the granular salt is conveyed to the reactor where it is then subjected to electrolysis under an inert atmosphere and reduced pressure to remove the impurities. Following this treatment the purified molten salt flows from the reactor to the filter where any agglomerates or oversized particles are removed. The salt is then conveyed to the formation tank where the carbon cathode to be used subsequently in a molten salt energy storage device is preconditioned by alternately charging in a positive direction and discharging in a negative direction while immersed in the purified electrolyte salt. The resulting impure molten salt containing impurities released from the carbon cathode in the formation tank then flows by gravity into the dump tank. Upon pressurizing the dump tank, the salt flows back into the reactor through the transfer line indicated for further purification and is filtered and returned to the formation tank. A portion of the purified salt is transmitted to the dry box for use as an electrolyte in an electrochemical cell, while a separate portion can again be utilized in the formation tank in the preconditioning of another carbon electrode. The process described in this invention may be operated continuously or intermittently.

The degree of contamination of the salt to be purified is not a critical factor in this invention since, irrespective of the amount of the impurities initially present, treatment in accordance with the process described results in improved performance of the salt. Generally, however, salts containing from 0.3 to 10 percent by weight of impurities may be treated advantageously, and the degree of purification obtained is proportional to the duration of the treating time. The salt is considered to be sufficiently pure when a maximum voltage is reached for a particular electrochemical system on electrolyzing the salt at constant current. For example, this qualification is met for a eutectic mixture of lithium chloride-potassium chloride by electrolyzing the salt at a constant current of 63.5 milliamperes per $inch^2$ of cathode until a potential of 3.335 volts is achieved in a cell containing a graphite cathode, an aluminum-lithium alloy anode and which is operated at a temperature of 500° C. a pressure of 1 p.s.i. absolute, in an argon atmosphere.

Although as previously stated the exact nature of the impurities removed is not definitely known, gaseous materials such as water, chlorine, hydrogen, oxygen, nitrogen, methane, carbon dioxide and carbon monoxide have been detected at the electrodes of the purification cell and metal oxides are reduced on the surface of the anode.

Although this process is applicable to the purification of metal salts of alkali metals, alkaline earth metals, or mixtures thereof, wherein the anion is selected from the group consisting of nitrates, nitrites, or halides, or metal salts of alkali metals wherein the anion is a carbonate group, the process is particularly applicable to salt mixtures of halide salts of alkali metals and alkaline earth metals because they are most suitable for use in the energy storage cell described herein. Fused salt mixtures containing, for example, sodium chloride, calcium chloride, calcium fluoride, magnesium chloride, lithium chloride, potassium chloride, lithium bromide and potassium bromide can be used. The lower melting point electrolytes are desirable. Specific examples of useful binary salt electrolytes are lithium chloride-potassium chloride, lithium bromide-potassium bromide, lithium fluoride-rubidium fluoride, lithium chloride-lithium fluoride, lithium chloride-strontium chloride, calcium chloride-lithium chloride, lithium sulfate-potassium chloride, and mixtures thereof.

Examples of ternary molten salt electrolytes useful in this invention are calcium chloride-lithium chloride-potassium chloride, lithium chloride-potassium chloride-sodium chloride, calcium chloride-lithium chloride-sodium chloride, and lithium bromide-sodium bromide-lithium chloride.

Especially preferred systems are those of potassium chloride-lithium chloride and lithium bromide-potassium bromide and mixtures thereof. A lithium chloride-potassium chloride system of 41 mole percent potassium chloride and 59 mole percent lithium chloride forms a eutectic which melts at 352° C.

This invention can be employed where highly purified alkali metal and alkaline earth metal halide salts are essential for certain other uses in addition to their specific use in electrical energy storage devices.

A preferred embodiment of this invention is illustrated by the schematic flow diagram shown in FIG. 1 wherein the impure granulated salt is added to the loader 10 and is heated to a temperature in the range from about 100° C. to about 50° C. below its melting point and generally not above 300° C. The loader is designed to operate within the range of full vacuum to 30 p.s.i. absolute. As heat is applied to the salt, an inert gas such as, for example, argon or helium is swept across the surface of the salt to carry off the surface adsorbed gases and moisture that are driven off on heating. The length of time required for drying is determined by checking the amount of moisture present in the off gas at various time intervals. When the concentration of water vapor in the off gas falls below 35 p.p.m. at a gas sweep rate of 5 s.c.f./hr. the salt is considered to be essentially dry. The drying period may require from one to several days. The pressure in the loader is then brought to atmospheric pressure with the inert gas and the salt is transmitted to the reactor 12.

The reactor vessel 12 is designed to operate at pressures ranging from full vacuum to 65 p.s.i. absolute and temperatures of up to 650° C. The salt is maintained in the molten state in the reactor and means is provided for continuous agitation of the salt while the purification is taking place. An inert atmosphere, preferably argon, is also provided. The electrolysis unit consists of a porous carbon or graphite cathode, a lithium alloy anode, and the salt being purified functions as the ion-conducting medium.

In general, the carbons utilized in the preparation of the cathode may comprise such materials as activated petroleum coke, wood char, activated sodium lignosulfonate char, activated bituminous coal, polyvinylidine chloride char, polyacrylonitrile char and the like. The graphite composition may comprise any commercially available graphite prepared from any one of the foregoing types of carbon.

The anode of this reactor comprises lithium or a lithium alloy such as aluminum-lithium, indium-lithium, tin-lithium, lead-lithium, silver-lithium, copper-lithium, etc. Ternary lithium alloys can likewise be used.

The preferred anode is the highly reversible aluminum-lithium electrode. This electrode can be produced by combining lithium with aluminum and thus producing a preformed alloy of aluminum and lithium, or, electrochemically, by charging a substantially pure aluminum bar in an electrolyte containing lithium ions to the extent of about one ampere hour per gram of aluminum, whereby lithium is diffused into the aluminum bar.

The preferred aluminum-lithium alloy anode comprises aluminum and incidental impurities in amounts of from about 70 to 95 weight percent based on total composition, and from 5 to 30 weight percent lithium.

In the electrolysis step of the instant process, the cell is charged at a constant current of, for example, 63.5 milliamperes per inch$^a$ of cathode to a maximum voltage up to the decomposition potential of the particular salt being electrolyzed. During the reaction the gaseous impurities in the salt are evolved at the electrodes and the metallic impurities are deposited on the surface of the anode. Upon completion of the treatment of the salt, the molten salt is conveyed from the reactor to the filter 14 where most of the solid material is removed. Pressure of approximately 35 p.s.i. absolute of argon is applied to force the salt through the filter and on to the formation tank 16. The circulating molten salt is then transmitted to the formation tank 16 where the carbon cathode to be used subsequently in a molten salt electrical energy storage cell is preconditioned before use. The counter aluminum-lithium electrode in the formation tank is reused for subsequent preconditioning of carbon cathodes. An inert atmosphere is maintained in the formation tank and the tank is capable of being operated at full vacuum to 14.8 p.s.i. absolute of pressure and at temperatures of up to 650° C. After the preconditioning treatment has provided the desired state of charge, the electrode is removed from the formation tank and placed in a battery container and the remaining elements assembled.

On completion of the preconditioning of the cathode, the electrolyte salt now containing impurities removed from the electrode is circulated to the dump tank 18. The dump tank is sufficiently large to hold the salt from the reactor 12 and the formation tank 16. This tank serves as a means for recirculating the salt from the formation tank to the reactor for reprocessing and back to the formation tank. It also serves as an emergency dump container to receive any overflow from the formation tank. The tank is capable of being operated under the same temperatures and pressures as employed in the reactor. The vapor phase of the dump tank is connected with the vapor phase of the formation tank so that equal pressures are maintained to insure proper gravity flow. The salt from the dump tank is then pressurized to cause flow to the reactor where it is again purified. The purified salt from the reactor is recirculated to the filter 14, then to the formation tank where it again can be utilized in the preconditioning of other carbon electrodes, or, if desired, it may be conveyed to the dry box 20 where it is resolidified and maintained under a purified inert atmosphere at a temperature below about 300° C. for use in an electrochemical cell.

Figure 2:
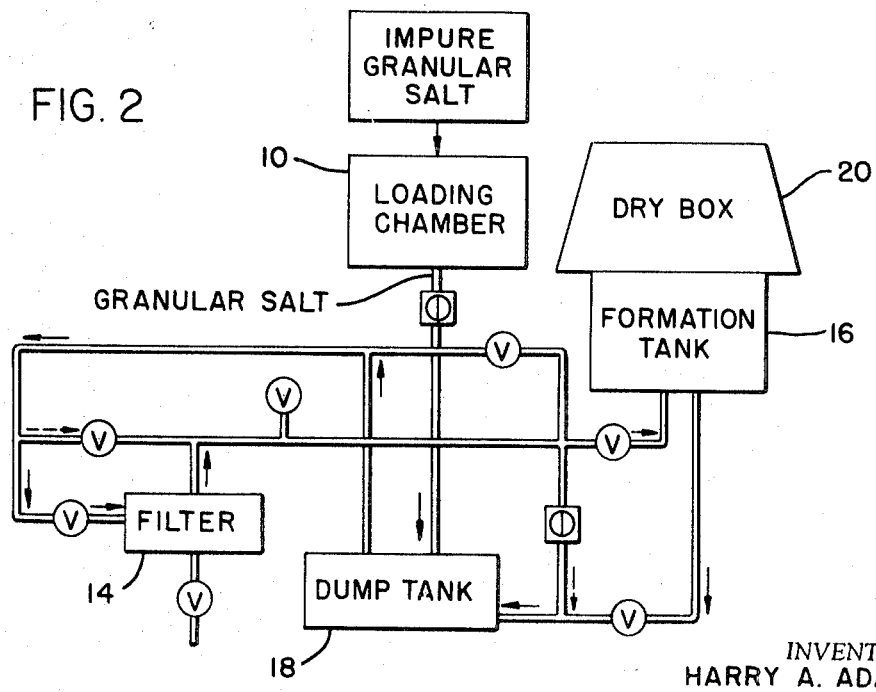

In another embodiment of this invention, the salt treatment and preconditioning of the carbon cathode may be accomplished simultaneously in a single electrolysis operation carried out in the formation tank. In such an arrangement, shown in the schematic diagram in FIG. 2, the reactor vessel is bypassed and the solid salt is conveyed from the loader 10 to the dump tank 18 where the salt is heated to at least 50°C. above its melting point and the molten salt is then passed through the filter 14 and then to the formation tank 16 where, in the electrochemical treatment, gaseous impurities from the electrolyte and the carbon cathode are evolved at the electrodes and metal impurities are deposited on the anode.

It is essential that the materials employed in the construction of the component parts of the system described are resistant to the thermal and chemical degradation caused by the molten salt. For purposes of this process, stainless steels of the 300 series are suitable, and most preferred are the 316 and 347 stainless steels. The treated salt is less corrosive than the untreated salt so that component parts of the processing equipment coming in contact with the purified salt can be constructed from lower cost materials such as, for example, the carbon steels.

A better understanding of the invention may be obtained from the following specific example.

EXAMPLE

The assembly unit employed in this example included a main control panel to control the temperatures and pressures throughout the unit. An atmosphere of argon was maintained throughout the system. The flow rate of the salt was controlled by the pressure differences from one vessel to another. All components of the system coming in contact with the electrolyte salt were constructed from 347 stainless steel.

In this particular example, 25 pounds of a granular electrolyte salt comprising a eutectic mixture of 41 mole percent lithium chloride and 59 mole percent potassium chloride were placed in a loader 10 having a 7-gallon capacity. Before treatment the electrolyte salt contained the following impurities as determined by spectrographic analysis:

| | |
|---|---|
| water | 0.4% |
| Iron | 0.002% |
| Chlorine (as $ClO_3^1$) | 0.003T |
| Nickel | major |
| Aluminum | 10 p.p.m. |
| Copper | 10 p.p.m. |
| Magnesium | 10 p.p.m. |
| Manganese | 10 p.p.m. |
| Silicon | 10 p.p.m. |
| Chromium | trace |
| Niobium | trace |
| Phosphorus | trace |
| Titanium | trace |

The loader was operated at a temperature of 177° C. and a pressure of approximately 2.5 p.s.i. absolute. The loader was purged with argon at the rate of 5 s.c.f./hr. to carry off excess moisture and other surface adsorbed gases given off during the heating of the salt. The off gas was analyzed continuously until the water content remained constant at about 35 p.p.m. The loader was then repressurized with argon to atmospheric pressure to transmit the salt to the reactor. The reactor 12 had a capacity of 20 gallons and was equipped with a stirrer to continuously agitate the salt during the purification step. An electrolysis unit consisting of a graphite cathode and an aluminum-lithium alloy anode (18 weight percent lithium) was added through the top entry port of the reactor. The reactor was purged with argon and was operated at a temperature of 538°C. and a pressure of approximately 1 p.s.i. absolute. The molten electrolyte salt was electrolyzed at a constant current of 63.5 milliamperes per inch$^2$ of cathode for about 48 hours until a potential of 3.34 volts was achieved. Spectrographic analysis of the composition of the electrolyzed salt indicated the absence of chromium, copper, iron, manganese, nickel, niobium, phosphorus and titanium and the presence of trace amounts of aluminum, magnesium and silicon. Following the electrolysis, the reactor was pressurized with argon to transmit the purified salt from the reactor to the filter 14 and a pressure of approximately 35 p.s.i. absolute was applied to convey the salt through the filter. The salt was then transmitted to the formation tank 16 and subsequently to the dry box 20.

The purified salt was subsequently utilized as an electrolyte in a molten salt electrical energy storage cell employing a porous carbon cathode and an aluminum-lithium alloy anode. The cell exhibited an electrical energy storage capacity of 2 ampere-hours per cubic inch of carbon cathode as compared with a capacity of 1.0 to 1.5 ampere-hours per cubic inch of carbon cathode obtained for a cell utilizing the untreated salt.

I claim:
1. A method for increasing the electrical energy storage capacity of a molten electrolyte salt electrical energy storage device wherein the electrolyte salt is subjected to the following sequence of treating steps prior to use in said electrical energy storage device:
   1. heating to a temperature of from about 100°C. up to about 50°C. below the melting point of the salt in a substantially oxygen-free environment and at a pressure of about 0.1 to 30 p.s.i. absolute and removing the volatile components from the salt by continuously purging the vessel with an inert gas;
   2. melting the salt resulting from step (1) at a pressure of from about 0.1 to 65 p.s.i. absolute, in a substantially oxygen-free environment, immersing into the molten salt a pair of spaced opposed electrodes comprising a carbon cathode and a lithium alloy anode, and electrolyzing said molten salt at a constant current until a predetermined maximum voltage is achieved; and
   3. separating any solid material from the molten salt.
2. The method of claim 1 wherein the anode in step (2) consists essentially of an aluminum-lithium alloy.
3. The method of claim 2 wherein the anode consists essentially of an alloy of 70 to 95 weight percent of aluminum and 5 to 30 weight percent of lithium.
4. The method of claim 3 wherein the electrolyte salt is a mixture of lithium chloride and potassium chloride.
5. The method of claim 4 wherein the electrolyte salt is a eutectic mixture of lithium chloride and potassium chloride.

PO-1050
(5/69)

UNITED STATES PATENT OFFICE
CERTIFICATE OF CORRECTION

Patent No. 3,607,407                    Dated September 21, 1971

Inventor(s) Harry A. Adams

It is certified that error appears in the above-identified patent and that said Letters Patent are hereby corrected as shown below:

Abstract:   Line 2, "like" should be ---life---

Column 1:   Line 3, old title "Salt Purification and Circulation System" should be eliminated Column 3:   Line 38, "inch$^a$" should be ---inch$^2$---

Column 4:   Line 52, "ClO$_3^1$" should be ---ClO$_3^-$---

"       "       second column "0.003T" should be ---0.003%---

Signed and sealed this 28th day of March 1972.

(SEAL)
Attest:

EDWARD M. FLETCHER, JR.                 ROBERT GOTTSCHALK
Attesting Officer                       Commissioner of Patents